(12) United States Patent
Raz et al.

(10) Patent No.: US 12,725,051 B2
(45) Date of Patent: Sep. 1, 2026

(54) RANKING DATA SLICES USING MEASURES OF INTEREST

(71) Applicant: International Business Machines Corporation, Armonk, NY (US)

(72) Inventors: Orna Raz, Haifa (IL); Samuel Solomon Ackerman, Haifa (IL); Marcel Zalmanovici, Kiriat Motzkin (IL); Eitan Daniel Farchi, Pardes Hanna-Karkur (IL); Ramasuri Narayanam, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 17/584,696

(22) Filed: Jan. 26, 2022

(65) Prior Publication Data

US 2023/0237343 A1 Jul. 27, 2023

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS

2004/0039548 A1 2/2004 Selby et al.
2020/0387753 A1 12/2020 Brill et al.
2021/0004671 A1* 1/2021 Brill et al. ............ G06F 18/285

OTHER PUBLICATIONS

Yadolah Dodge. The Concise Encyclopedia of Statistics. ISBN 978-0-387-32833-1. (Year: 2008).*
Ramasuri Narayanam et al. A Shapley Value-Based Approach to Discover Influential Nodes in Social Networks. https://doi.org/10.1109/TASE.2010.2052042 (Year: 2011).*
Vivek Bagaria et al. Medoids in almost linear time via multi-armed bandits. https://arxiv.org/abs/1711.00817v3 (Year: 2017).*
Yeounoh Chung et al. Automated Data Slicing for Model Validation: A Big Data—AI Integration Approach. https://arxiv.org/abs/1807.06068v3 (Year: 2019).*
Eitan Farchi et al. Ranking Data Slices for ML Model Validation: A Shapley Value Approach. https://doi.org/10.1109/ICDE51399.2021.00180 (Year: 2021).*
Christopher Manning et al. Introduction to Information Retrieval, published Apr. 1, 2009. https://web.archive.org/web/20090923004445/https://nlp.stanford.edu/IR-book/information-retrieval-book.html (Year: 2009).*

(Continued)

*Primary Examiner* — Alexey Shmatov
*Assistant Examiner* — Shishir Agrawal
(74) *Attorney, Agent, or Firm* — Eric W. Chesley

(57) ABSTRACT

An example system includes a processor to receive a test set, data slices, and a measure of interest. The processor can rank the data slices based on the test set, the data slices, and the set of measures of interest. The test set includes data points from the same feature space used to train a machine learning model. Each data slice is ranked according to generated slice grades representing unique information contribution of each data slice to the measure of interest with respect to the other data slices. The processor can then present the ranked data slices.

15 Claims, 9 Drawing Sheets

(56) References Cited

OTHER PUBLICATIONS

Wikipedia on tf-idf backdated to Jan. 21, 2022. https://en.wikipedia.org/w/index.php?title=Tf%E2%80%93idf&oldid=1066962056 (Year: 2022).*

Ackerman et al., "FreaAI: Automated extraction of data slices to test machine learning models", Engineering Dependable and Secure Machine Learning Systems, Aug. 12, 2021, 9 pages.

Ackerman et al., "Machine Learning Model Drift Detection via Weak Data Slices", DeepTest workshop of ICSE, Aug. 11, 2021, 8 pages.

Chen et al., "Slice-based Learning: A Programming Model for Residual Learning in Critical Data Slices", Advances in Neural Information Processing Systems, Dec. 23, 2019, 27 pages.

Chung et al., "Slice Finder: Automated Data Slicing for Model Validation", IEEE 35th International Conference on Data Engineering (ICDE), Jul. 2018, 13 pages.

Mell et al., "The NIST Definition of Cloud Computing", National Institute of Standards and Technology, U.S. Department of Commerce, Special Publication 800-145, Sep. 2011, 7 pages.

* cited by examiner

100A

200

RANKING DATA SLICES USING MEASURES OF INTEREST

BACKGROUND

The present techniques relate to data slice ranking. More specifically, the techniques relate to ranking data slices using measures of interest.

SUMMARY

According to an embodiment described herein, a system can include processor to receive a test set, data slices of the test set, and a measure of interest, wherein the test set comprises data points from the same feature space used to train a machine learning model. The processor can also further rank the data slices based on the test set, the data slices, and the measure of interest, wherein each data slice is ranked according to generated slice grades representing unique information contribution of each data slice to the measure of interest with respect to the other data slices. The processor can also present the ranked data slices.

According to another embodiment described herein, a method can include receiving, via a processor, a test set, data slices of the test set, and a set of measures of interest, wherein the test set comprises data points from the same feature space used to train a machine learning model. The method can further include grading, via the processor, for a subset of each of the data slices, data points in each subset for each measure of interest based on uniqueness with respect to other slices. The method can also further include aggregating, via the processor, the grades of the data points in the subsets to generate a slice grade for each data slice. The method can also include ranking, via the processor, the data slices based on slice grade.

According to another embodiment described herein, a computer program product for ranking data slices can include computer-readable storage medium having program code embodied therewith. The computer readable storage medium is not a transitory signal per se. The program code executable by a processor to cause the processor to receive a test set, data slices of the test set, and a set of measures of interest, wherein the test set comprises data points from the same feature space used to train a machine learning model. The program code can also cause the processor to grade, for a subset of each of the data slices, data points in each subset for each measure of interest based on uniqueness with respect to other slices. The program code can also cause the processor to aggregate the grades of the data points in the subsets to generate a slice grade for each data slice. The program code can also cause the processor to rank the data slices based on slice grade.

DETAILED DESCRIPTION

Figure 1A:
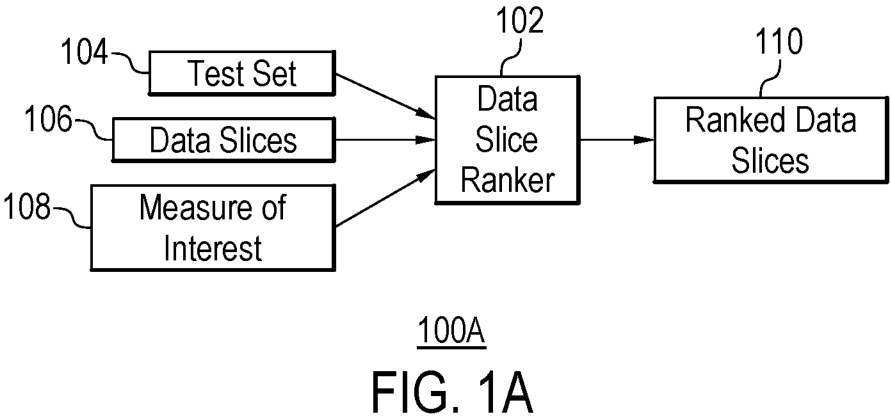
FIG. 1A is a block diagram of an example system for ranking data slices.

Machine learning (ML) models and systems that embed ML models are becoming more prevalent. As a result, the quality of such ML models may be sought to be governed. For example, a person governing and testing the ML models may focus on basic performance measures on the test set, such as accuracy, as well as deeper analysis of type of error probability. In addition, a focus on bias and fairness analysis has emerged as standard practice. As ML models are data driven and statistical, analysis may focus on forecasting and attempts to answer whether or not the ML model will frequently be biased or have some type of error. For example, this type of analysis may slice the test data in certain ways to obtain a desired forecast.

However, a data set can be sliced in many ways. In fact, the number of possible subset of the test data is exponential. In addition, arbitrary subsets of the data or data slices may represent weakness of ML model performance unknown to the ML tester or ML model developers. A human, such as the ML tester, may only be able to effectively inspect a small number of such data slices. Moreover, there may be various reasons for triggering human inspection. For example, a data slice may represent a high concentration of errors or the chance of that data slice occurring in production is high. Thus, the task of identifying a good data slice to review may have multiple utilities that may need to be consolidated. In addition, different data slices may provide substantially the same information. As one example, several overlapping data slices may be identified on an attribute such as bigger than a value of 65 and bigger than a value of 64 that may reveal the same information. For example, the model may misperform on such higher values. Another example of redundancy may be identifying the same records but due to different feature combinations and values. This may happen because the problem is multi-dimensional, but a data slice may be more difficult to understand if the data slice contains many dimensions.

According to embodiments of the present disclosure, techniques are described to a system that includes a processor to receive a test set, data slices, and a set of measures of interest. For example, the test set may be any set of data points from the same feature space as data points of a training data set used to train a machine learning model, but preferably not the same data points. The processor can rank the data slices based on the test set, the data slices, and the set of measures of interest. Each data slice is ranked according to generated slice grades representing unique information contribution to the set of measures of interest with respect to the other data slices. The processor can then present the ranked data slices. Thus, embodiments of the present disclosure enable a specific data point view in which unique points may be picked and inspected to explain why a data slice was chosen. In addition, the embodiments herein enable grading of models by aggregation of slice grades. Thus, the techniques enable identification of a small set of data slices that highlights the weaknesses of a model and provide an explanation as to why they were chosen.

With reference now to FIG. 1A, a block diagram shows an example system for ranking data slices. The example system 100A can be implemented using a processor, such as the processor 502 or the processor 802 of FIGS. 5 and 8.

In the example of FIG. 1A, the system 100A includes a data slice ranker 102. The data slice ranker 102 is shown receiving a test set 104, data slices 106, and a measure of interest 108. The data slice ranker 102 is further shown outputting ranked data slices 110.

Still referring to FIG. 1A, the data slice ranker 102 may receive a test set 104 T of data points and a set of data slices 106 $\{S_1, \ldots, S_k\}$. In various examples, the data slices 106 may be a subset of data points in T defined by some logical condition. For example, the logical condition may be a rule over a feature space, which may include ranges for continuous values and values of discrete features, and their intersection. In some examples, the data slices 106 may be a subset of data points that indicate particular weaknesses. For example, the weaknesses may include an unexpectedly high error rate associated with the subset of data points in a trained ML model. As one example, an ML model may receive as input the features and their values, and output predictions. The input features and values may have labels for determining error concentrations and automatically generating associated data slices. For example, the prediction of the ML model may be correct and thus match the label, or incorrect and thus not match the label. In some examples, density-based slices may also be used in which a label and prediction is not used. Density-based data slices may indicate the hyper-rectangles of data points in which there is sparse data relative to the overall density or relative to the empty regions. In various examples, data slices may be automatically generated using any other suitable techniques and provided to the data slice ranker 102.

In various examples, the data slice ranker 102 can consider a subset $B_i$ of a data slice $S_i$ of interest. For example, given a measure of interest 108 of error concentration, $B_i$ may represent the error that a model made on the data slice 106 $S_i$. Each data point x in $B_i$ is assigned a grade that represents the uniqueness of the data point x with respect to the other data slices 106. For example, the less that the data point x appears in data slice of interest $S_i$ and not in the other data slices 106, the more important $S_i$ becomes with respect to the measure represented by $B_i$. In various examples, this is aggregated to give a grade to the data slice $S_i$. In some examples, the process may then be repeated for each additional measure of interest 108 if there is more than one measure of interest 108. For example, the process can be repeated for other received measures of interest 108, such as accuracy and statistical significance, obtaining a slice grade for each data slice 106 with respect to each of the other measures of interest 108. The slice grades may be used to rank the data slices and present the ranked data slices 110 to an end user. For example, a set of top k ranked data slices 110 may be presented to ML testers. In some examples, the ML testers may be provided with a top k ranked data slices 110 for each measure of interest 108.

In various examples, the presented ranked data slices 110 may also be provided with representative data points to enable a specific data point view. For example, ML testers can then select unique data points and receive a unique explanation for each data point. Thus, in addition to the ranked data slices 110 themselves, a user may be presented with a data point x that explains why a particular ranked data slice 110 was chosen. Such a data point x in $S_i$ on average may be appearing in this data slice 106 $S_i$ and not in the other data slices 106 when considering each measure of interest 108 most of the time.

In various examples, the model may also be given a grade by aggregating the grades of the data slices. For example, the average of the empirical distribution and the slice grades may be given.

In some examples, the slice grades may be obtained by first defining cooperative games for each of the measurers of interest 108 for which the data slices 106 are the players and a Shapley value may then be used to obtain the slice grades. For example, a polynomial-time algorithm referred to as a Shapley Slice Ranking with Error concentration (SSR-E), may be used to rank data slices based on Shapley value techniques from cooperative game theory. In particular, using SSR-E may include analytically deriving a closed form expression to compute a value for each data slice to capture a set of the most under-performing data slices. For example, an SSR-E based system 100B is described with respect to FIG. 1B.

In some examples, the aggregate measure may be implemented by updating an overall common ML performance metric, such as accuracy, based on the score of each data slice. For example, every record that belongs to a data slice may receive a slice rank rather than the average data set metric value. Then, the updated individual record values are used to recalculate the adjusted score. In various examples, this adjusted score may then be used for risk assessment. For example, the larger the difference between the average metric value and the updated metric value the higher the risk. An example system 200 for assessing risk is described with respect to FIG. 2.

It is to be understood that the block diagram of FIG. 1A is not intended to indicate that the system 100A is to include all of the components shown in FIG. 1A. Rather, the system 100A can include fewer or additional components not illustrated in FIG. 1A (e.g., additional test sets, data slices, measures of interest, or ranked data slices, etc.).

Figure 1B:
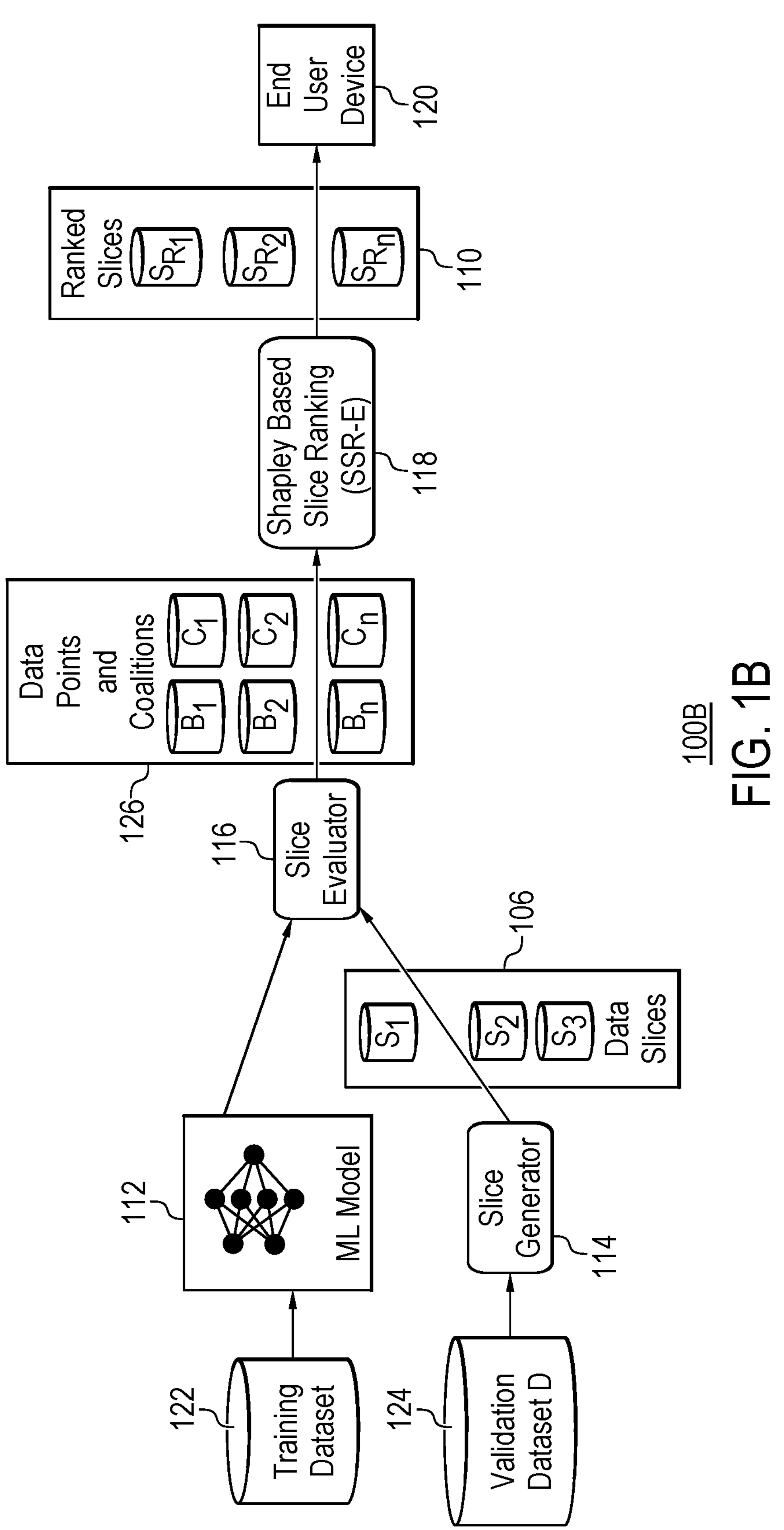
FIG. 1B is a block diagram of a more detailed system for ranking data slices using a Shapley value approach.

With reference now to FIG. 1B, a block diagram shows an example system for ranking data slices using a Shapley value approach. The example system 100B can be implemented using a processor, such as the processor 502 or the processor 802 of FIGS. 5 and 8.

In the example of FIG. 1B, the system 100B includes similarly referenced elements from FIG. 1A. In addition, the system includes a machine learning model 112 and a slice generator 114 communicatively coupled to a slice evaluator 116. The system 100B further includes a Shapley Based Slice Ranker with Error concentration (SSR-E) 118 communicatively coupled to the slice evaluator 116. The system 100B further includes an end user device 120 communicatively coupled to the SSR-E 118. The machine learning model 112 is shown receiving a training dataset 122 and generating predictions to be used for error related calculations. The slice generator 114 is shown receiving a test dataset 124. The slice generator 114 is shown generating data slices 106. The slice evaluator 116 is shown receiving data slices 106 and generating data points and coalitions 126. The SSR-E 118 is shown receiving data points and coalitions 126 and generating ranked data slices 110. The end user device 120 is shown receiving the ranked data slices 110.

As described in FIG. 1B, in some examples, an SSR-E 118 may be used to rank data slices based on Shapley value techniques from cooperative game theory. For example, given a test data set 124 $D=\{d_1, d_2, \ldots, d_m\}$ with m data points and a trained machine learning (ML) model 112 M, each data point $d_i \in D$ may be represented by a two-tuple: $di=(x_{d_i}, y_{d_i})$ where $x_{d_i}$ is a feature vector associated with the data point $d_i$ and contains values for k features. Thus, $x_{d_i}$ may be a vector of the form $(F_1, F_2, \ldots, F_k)$; and $y_{d_i}$ contains the ground-truth label for the data point $d_i$. In various examples, for each data point $di=(x_{d_i}, y_{d_i}) \in D$, the ML model 112 M can take the feature vector associated with di as input and predict a label, referred to herein as $M(x_{d_i})$, for data point $d_i$. In some examples, the data point $d_i$ may be considered correctly classified by M if $M(x_{d_i})=y_{d_i}$. Otherwise, the data point $d_i$ may be considered incorrectly classified by M. In various examples, for any $a \in [0, 100]$, if a % of the data points are correctly classified by the model M, then the accuracy of the model M may be a %.

In various examples, a data slice may be any subset of data points. For example, the data slice may be a subset of data point in a test data set D. All the data points in a data slice share some common feature-value pairs and accordingly a data slice may be represented by conjunction of such common feature-value pairs. In some examples, these data slices can be computed using any suitable automated data slice finding techniques. For example, the data slices can be computed using Slice Finder, described by Chung et al. in 2019, or the method described by Barash et al. in 2019. In some examples, for a given data slice $S \subseteq D$, if a % of the data points in S are correctly classified by the model M, then the accuracy of the model M on the data slice S may be a %.

In various examples, generate the slice grades by defining a cooperative game for each of the measurers of interest for which the data slices are players and calculate the slice grades using a Shapley value. For example, the set of players of a coalitional game may be denoted by $N=\{1, 2, \ldots, n\}$. A characteristic function $v: 2^N \rightarrow \mathbb{R}$ may be used to assign to every coalition $C \subseteq N$ a real number representing payoff attainable by each coalition. By convention, it may be assumed that $v(\emptyset)=0$. A characteristic function game my then be represented by a tuple (N, v). In various examples, it may be assumed that a grand coalition forms. For example, the grand coalition may be the coalition of all the agents in a game. Given this grand coalition, one of the questions of coalitional game theory is how to distribute the payoff of the grand coalition among the players. Among many different answers, the method described by Shapley in 1971 evaluates the role of each player in the game by considering its marginal contributions to all coalitions this player could possibly belong to. A certain weighted sum of such marginal contributions constitutes a player's payoff from the coalition game and is referred to as the Shapley value.

In various examples, the SSR-E 118 can calculate Shapley values for each of the data slices. For example, given $\pi \in \Pi(N)$ denoting a permutation of agents in N, and $C_\pi(i)$ denoting the coalition made of all predecessors of agent i in $\pi$ (given $\pi(j)$ the location of j in $\pi$, then: $C_\pi(i)=\{j \in \pi: \pi(j) < \pi(i)\}$). In various examples, the Shapley value may then be defined using the following equation:

$$SV_i(v) = \frac{1}{|N|!} \sum_{\pi \in \Pi} [v(C_\pi(i) \cup \{i\}) - v(C_\pi(i))] \quad \text{Eq. 1}$$

where the payoff assigned to $a_i$ in a coalitional game is the average marginal contribution of $a_i$ to coalition $C_\pi(i)$ over all $\pi \in \Pi$. The above formula can be rewritten as:

$$SV_i(v) = \sum_{C \subseteq A\{i\}} \frac{|C|!(|N| - |C| - 1)!}{|N|!} [v(C \cup \{i\}) - v(C)] \quad \text{Eq. 2}$$

In various examples, a test data set 124 D and the set of n interpretable (i.e. readable) data slices $N=\{S_1, S_2, \ldots, S_n\}$ may be given as input. The number of data slices for real world data sets may usually be very large in number. For the purpose of model development and validation, it may thus be hard for the users such as model developers, data scientists, etc. to manually identify the most under-performing data slices from a large collection of data slices. Therefore, in some examples, the SSR-E 118 can derive a priority order to give precedence to data slices with significant error concentration having most unique misclassified data points. For example, the significant error concentration may refer to misclassified data points by the model. In various examples, the SSR-E 118 can also prioritize data slices that are statistically significant. For example, the SSR-E 118 can prioritize data slices having larger sizes. In some examples, the SSR-E 118 may use an algorithmic methodology to automatically generate a ranking of the data slices $\{S_1, S_2, \ldots, S_n\}$ that solves this data slice ranking problem (DSRP).

In particular, in various examples, the SSR-E 118 may use a ranking mechanism based on the Shapley value concept. For example, the SSR-E 118 may model the data slices as players in a cooperative game and define two different characteristic foundations to capture the importance of error concentration and statistical significance of the data slices. As shown in FIG. 1B, a machine learning model 112 M and a set $N=\{S_1, S_2, \ldots, S_n\}$ of n data slices 106 of the test data set 124 D are given as input into the slice evaluator 116. For each data slice $S_i \in N$, $B_i$ may be the set of data points that are misclassified by the model M in $S_i$. For example, the set of data points $B_i$ may be defined using the Equation:

$$B_i = \{d_i | d_i = (x_{d_i}, y_{d_i}) \in S_i, \ni M(x_{d_i}) \neq y_{d_i}\} \quad \text{Eq. 3}$$

where, for each $i \in \{1, 2, \ldots, n\}$, it holds that $B_i \subseteq S_i$. A cooperative game $(N, v_e)$ may be defined in which the set of players is the set of data slices N and the characteristic function $v_e(.)$ is defined as follows. For any coalition (subset) of data slices $A \subseteq N$, the characteristic function may be defined using the Equation:

$$v_e(A) = \left|\bigcup_{S_i \in A} B_i\right| \quad \text{Eq. 4}$$

where the value of each coalition of data slices $A \subseteq N$ is the number of distinct misclassified data points belonging to the data slices in coalition A. This cooperative game $(N, v_e)$ is super-additive. For this cooperative game $(N, v_e)$, the Shapley value of each data slice can be expressed as a closed-form expression. For example, for the cooperative game $(N, v_e)$, the Shapley value of each data slice $S_i \in N$ may be calculated using the Equation:

$$\phi_{v_e}(S_i) = \sum_{b \in B_i} \frac{1}{|\{k: b \in B_k\}|} \quad \text{Eq. 5}$$

where the Shapley value of each data slice $S_i$ for all $i \in \{1, 2, \ldots, n\}$ is the independent sum of originality of its data points wherein the originality of each misclassified data point is inversely proportional to the number of data slices to which it belongs to. Eq. 5 provides a closed form expression to compute the Shapley values of data slices and these data slices can be arranged in non-increasing order of their Shapley values to derive a ranking. This ranking mechanism used by the SSR-E ranker 118 is thus referred to herein as Shapley Slice Ranking with focus on Error concentration (SSR-E). In some examples, the specific steps of SSR-E mechanism may be executed by the SSR-E ranker 118 using the example Algorithm 1 below:

Algorithm 1: Shapley Slice Ranking Mechanism with focus on Error concentration (SSR-E)

input: D: Test data set; M: trained machine learning model; $S_i$: i-th data slice; n: number of data slices of D; $N = \{S_1, S_2, \ldots, S_n\}$:set of all given data slices
output: $\emptyset_{v_e}(S_i)$: Shapley value of data slice $S_i$; $\emptyset_{v_e}$:vector of Shapley values of all data slices; R: rank order of the data slices based on $\emptyset_{v_e}$
foreach data slice $S_i \in N$ do
  $\emptyset_{v_e}(S_i) = 0$,
  $B_i = \{d_i | d_i = (x_{d_i}, y_{d_i}) \in S_i, \ni M(x_{d_i}) \neq y_{d_i}\}$
end
foreach data slice $S_i \in N$ do
  foreach data point $b \in B_i$ do
      $k = 1$
    foreach data slice $S_i \neq S_i$ do
      if b belongs to $B_j$ then
        $k = k + 1$
      end
    end
  end $\phi_{v_e}(S_i) = \phi_{v_e}(S_i) + \frac{1}{k}$
end
$\emptyset_{v_e} \leftarrow (\emptyset_{v_e}(S_1), \emptyset_{v_e}(S_2), \ldots, \emptyset_{v_e}(S_n))$
R: arrange the data slices in N in non-increasing order of their Shapley values, $\emptyset_{v_e}$
return R where algorithm 1 runs in polynomial time, in the number of data points m=|D| and the number of data slices n. In particular, the running time of Algorithm is $O(n^2m)$. In various example, the resulting ranked data slices 110 may be presented on a display. Thus, algorithm 1 may perform much more efficiently when compared with other methods performing in exponential time, which may become impractical much faster.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional datasets, ML models, ranking algorithms, data slices, data points, etc.).

Figure 2:
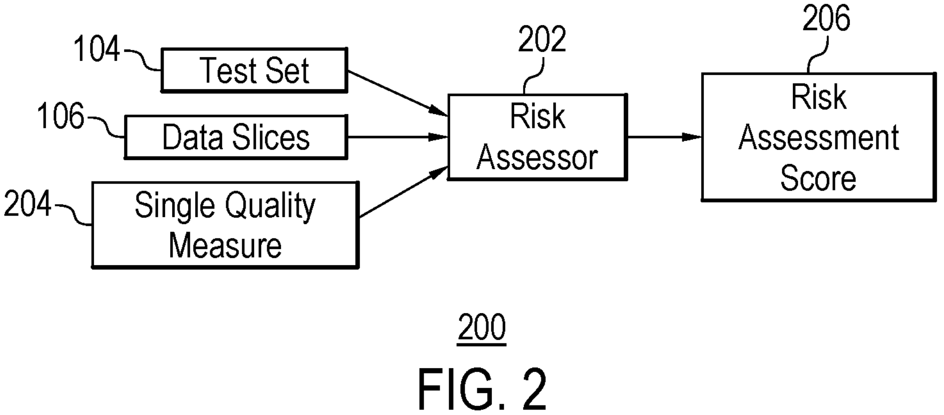
FIG. 2 is a process flow diagram of an example method that can assess risk using data slices.

With reference now to FIG. 2, a block diagram shows an example system for ranking data slices. The example system 200 can be implemented using a processor, such as the processor 502 or the processor 802 of FIGS. 5 and 8. In various examples, the system 200 can be used to implement the method 400 of FIG. 4.

In the example of FIG. 2, the system 200 includes similarly numbered elements of FIG. 1. In addition, the system includes a risk assessor 202. The risk assessor 202 is shown receiving the test set 104, data slices 106, and a single quality measure 204. The risk assessor 202 is further shown outputting a risk assessment score 206.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional datasets, data slices, single quality measures, or additional risk assessment scores, etc.).

Figure 3:
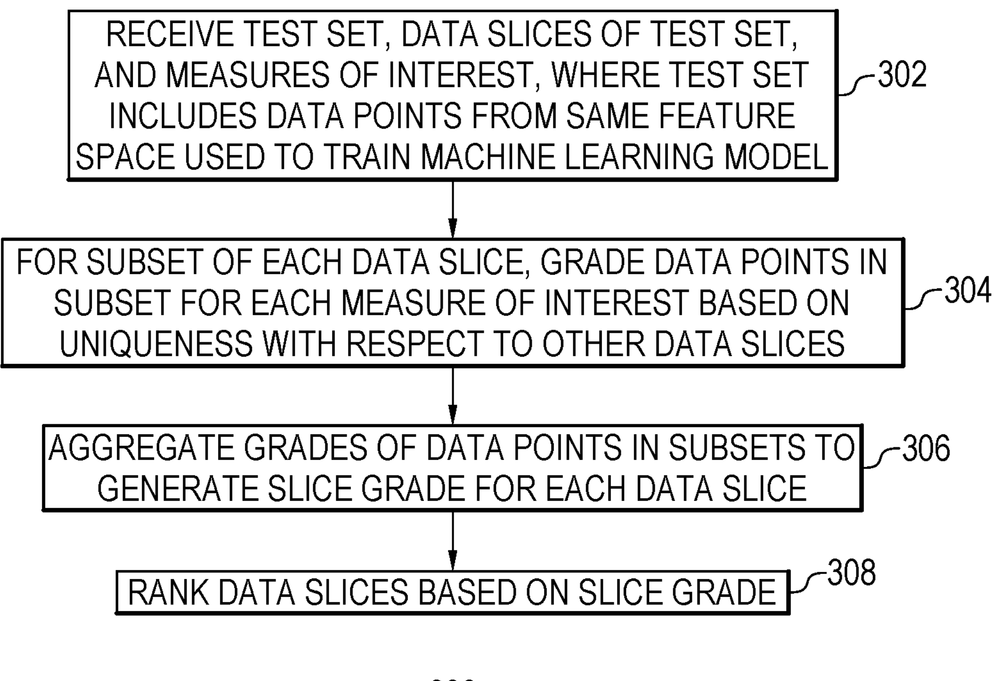
FIG. 3 is a process flow diagram of an example method that can rank data slices.

FIG. 3 is a process flow diagram of an example method that can rank data slices. The method 300 can be implemented with any suitable computing device, such as the computing device 400 of FIG. 4 and is described with reference to the system 100 of FIG. 1. For example, the methods described below can be implemented by the data slice ranker 102 of FIG. 1.

At block 302, a processor receives a test set, data slices of the test set, and measures of interest. For example, the measures of interest may include an error concentration measure, an accuracy measure, a statistical significance measure, a density measure, or any combination thereof.

At block 304, for a subset of each data slice, the processor grades data points in the subset for each measure of interest based on uniqueness with respect to other data slices. For example, the subset may be determined based on the measure of interest. As one example, the subset may be data points with high concentrations of errors.

At block 306, the processor aggregates grades of data points in subsets to generate a slice grade for each data slice. In some examples, the processor can define a cooperative game for each of the measurers of interest for which the data slices are players and calculating the slice grades using a Shapley value At block 308, the processor ranks data slices based on slice grade. For example, data slices with higher slice grades may be ranked higher.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 can further include aggregating the generated slice grades to generate single quality measure corresponding to a grade for the machine learning model trained on the training set. In some examples, the method 300 can include presenting the ranked data slices along with a representative data point for each of the ranked data slices.

Figure 4:
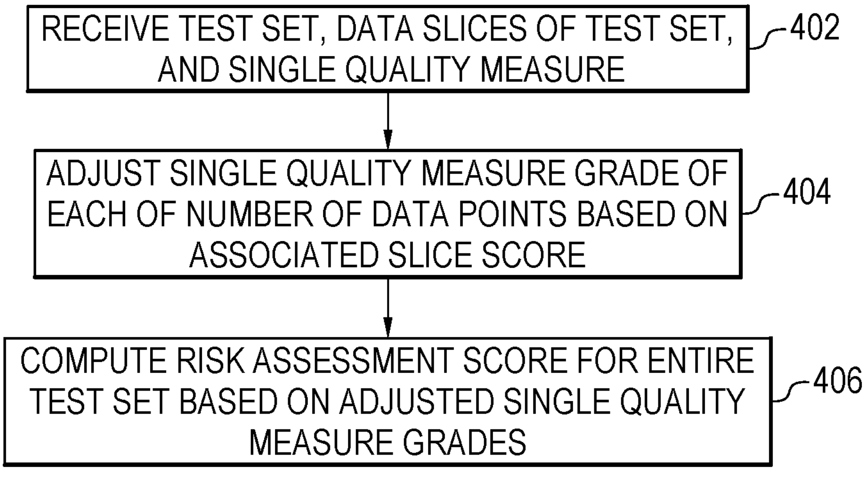
FIG. 4 is a process flow diagram of an example method that can assess risk using data slices.

FIG. 4 is a process flow diagram of an example method that can assess risk using data slices. The method 400 can be implemented with any suitable computing device, such as the computing device 500 of FIG. 5 and is described with reference to the systems 200 of FIG. 2. For example, the methods described below can be implemented by the risk assessor 202 of FIG. 2.

At block 402, a processor receives a test set, data slices of the test set, and a single quality measure. For example, the test set may include data points from the same feature space used to train a machine learning model. In various examples, the single quality measure may be a score calculated for the machine learning model that is an aggregation of each of the data points based on the data slices that each data point is a member of. For example, the single quality measure may be calculated using the method 300 of FIG. 3. For example, if the quality measure is accuracy, and the slices are error-based slices, then: any data point not in any slice may get a score equal to the average accuracy over the data set.

At block 404, the processor adjusts a single quality measure grade of each of a number of data points based on associated slice score. For example, the associated slice score may be a slice ranking of the slice including a particular data point. As one example, if the single quality measure grade is an error concentration measure, then data points within slices having higher rate of error may have their scores adjusted accordingly. For example, the score of a data point may be adjusted to reflect the poorest performing slice that the data point belongs to. As one examples, this may be the slice with the highest error rate. The function over the slices that the points is part of would be a minimum in this case. In some examples, each point that is in at least one slice may get an accuracy score that is a function of the accuracy scores of the slices that the data point belongs to. For example, this function may be a minimum, a maximum, or an averaging function.

At block 406, the processor computes a risk assessment score for the entire test set based on the adjusted single quality measure grades. For example, the risk assessment score may be computed by aggregating the score of the adjusted single quality measure grades of the data points with the rest of the data points in the test set. For example, the overall risk score may be the average score over the individual data point scores.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
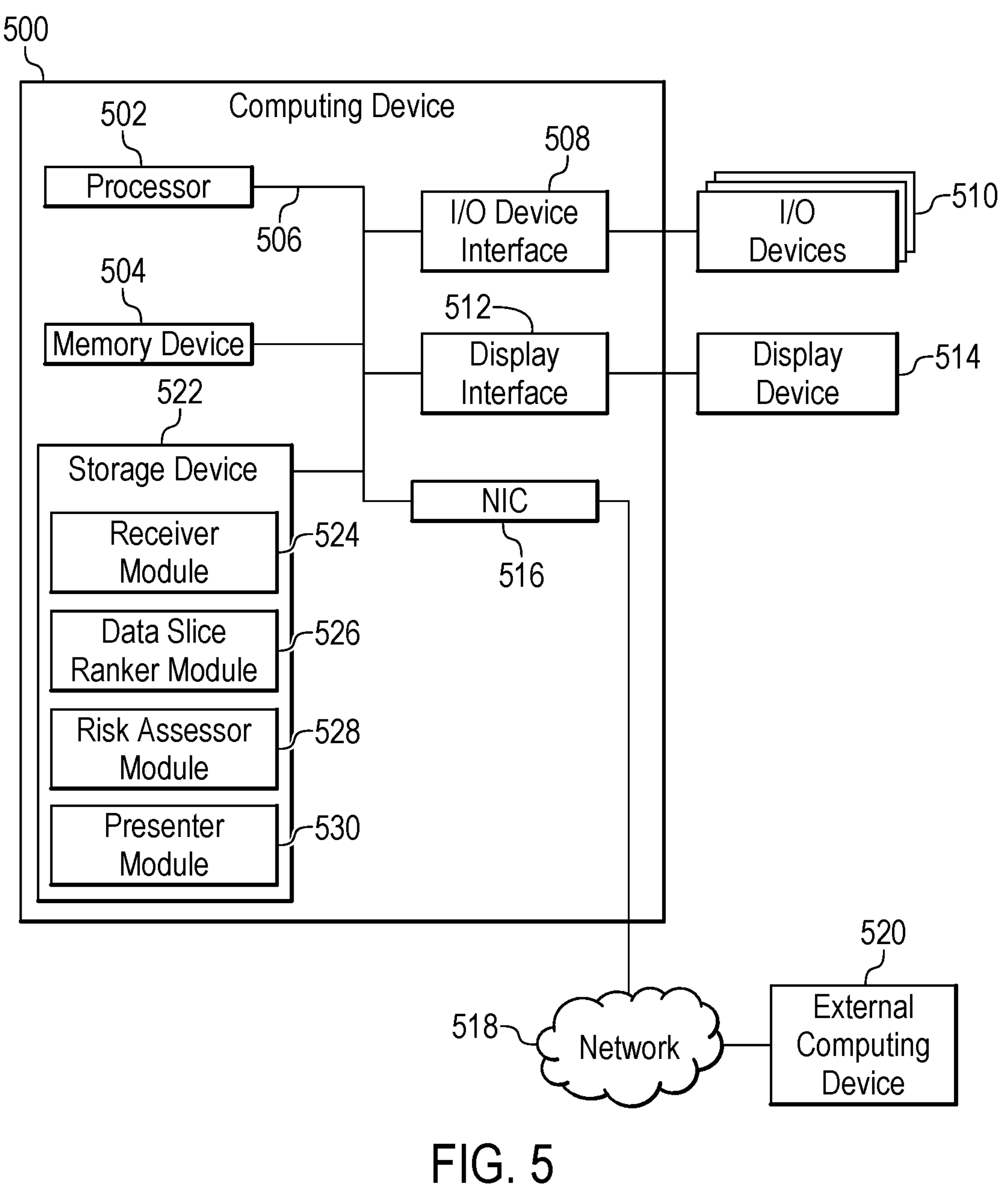
FIG. 5 is a block diagram of an example computing device that can rank data slices and assess risk using data slices.

FIG. 5 is block diagram of an example computing device that can rank data slices and assess risk using data slices. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a data slice ranker module 526, a risk assessor module 528, and a presenter module 530. The receiver module 524 can receive a test set, data slices, and measures of interest. For example, the test set may include data points from the same feature space used to train a machine learning model. In various examples, the measures of interest may include an error concentration, an accuracy measure, statistical significance, a density measure, or any combination thereof. In some examples, the receiver module 524 can receive a single quality measure. The data slice ranker module 526 can rank the data slices based on the test set, the data slices, and the measures of interest. For example, the data slice ranker module 526 can rank each data slice according to generated slice grades representing unique information contribution of each data slice to the measure of interest with respect to the other data slices. For example, the data slice ranker module 526 can generate a set of ranked data slices for each of the measures of interest. In some examples, the data slice ranker module 526 can generate the slice grades by defining a cooperative game for each of the measurers of interest for which the data slices are players and calculate the slice grades using a Shapley value. In some examples, the data slice ranker module 526 can aggregate the generated slice grades to generate single quality measure comprising a grade for the machine learning model trained on a training set. For example, the training set may include data points from the same feature space as the test set. The risk assessor module 528 can generate a risk assessment score based on a test set, data slices, and the single quality measure. The presenter module 530 can present the ranked data slices along with a representative data point for each of the ranked data slices, where the presenter module is to generate and present an explanation of a uniqueness of each representative data point and associated ranked slice with respect to the each measures of interest in the set of measures of interest. In some examples, the presenter module 530 can present a predetermined number of top ranked data slices for each of the measures of interest in the set of measures of interest.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the data slice ranker module 526, the risk assessor module 528, and the presenter module 530, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, data slice ranker module 526, risk assessor module 528, and the presenter module 530, can be implemented with logic, wherein the logic, as referred to herein, can include any suitable hardware (e.g., a processor, among others), software (e.g., an application, among others), firmware, or any suitable combination of hardware, software, and firmware.

Figure 6:
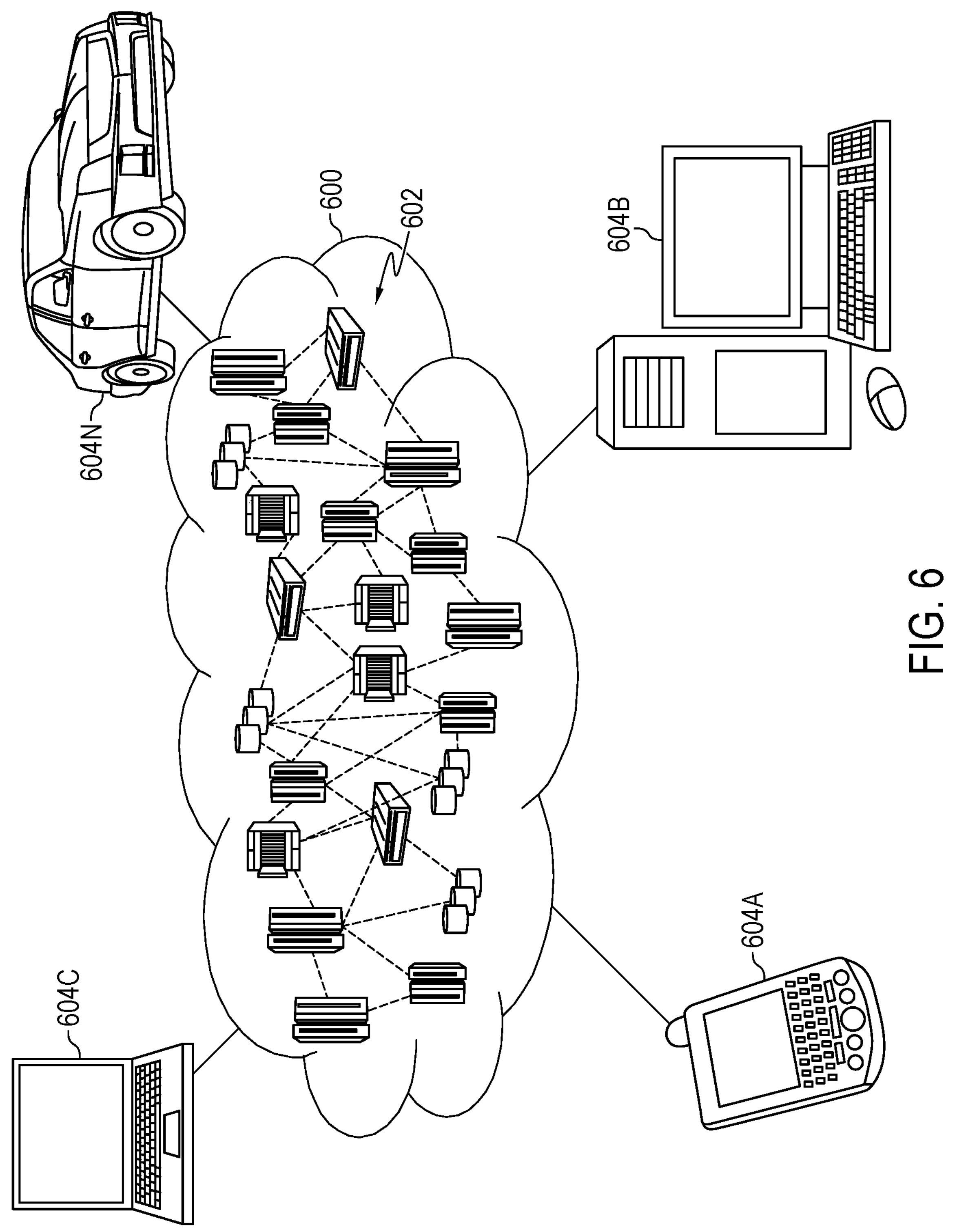
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
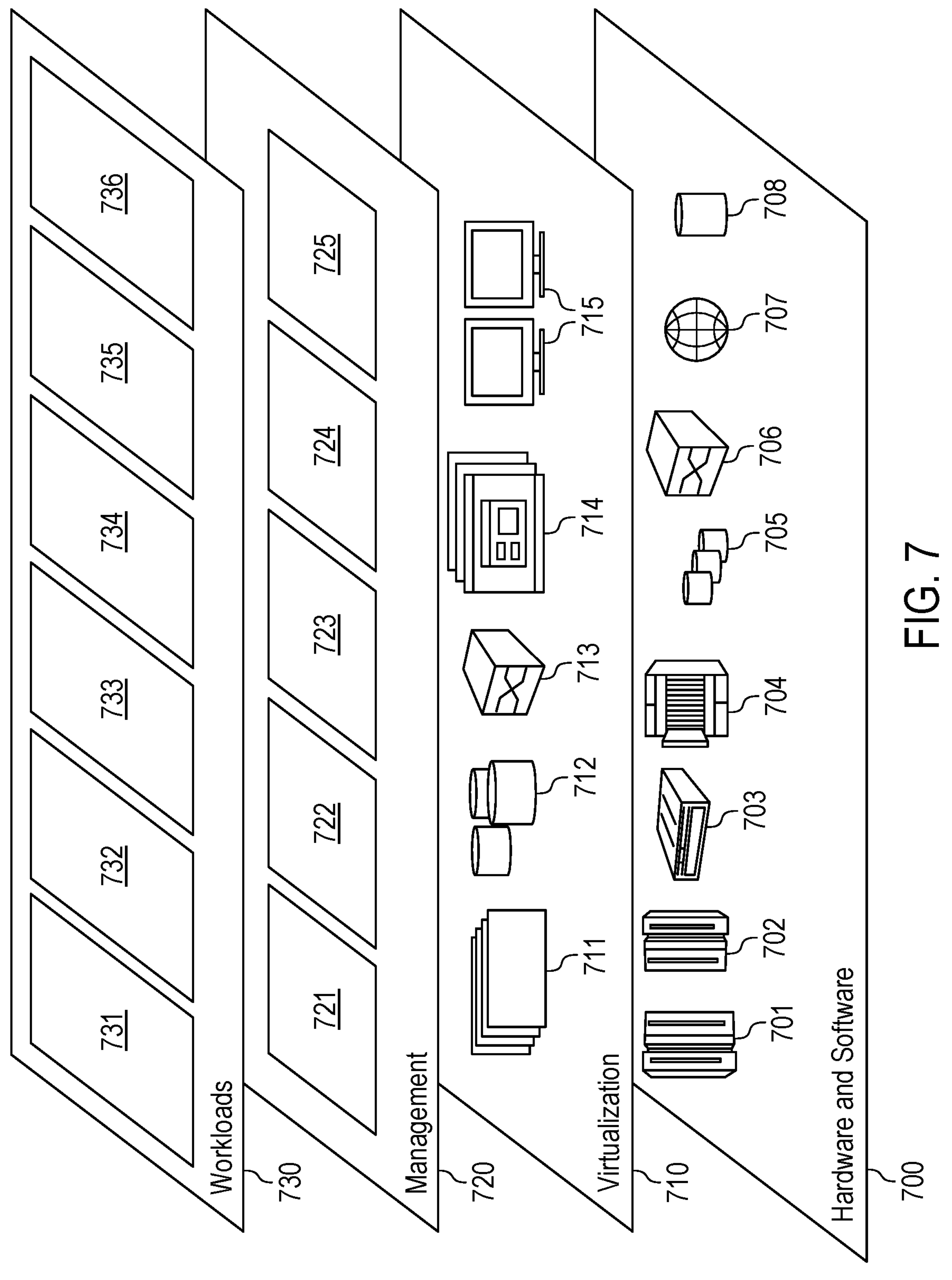
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and data slice ranking and risk assessment 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
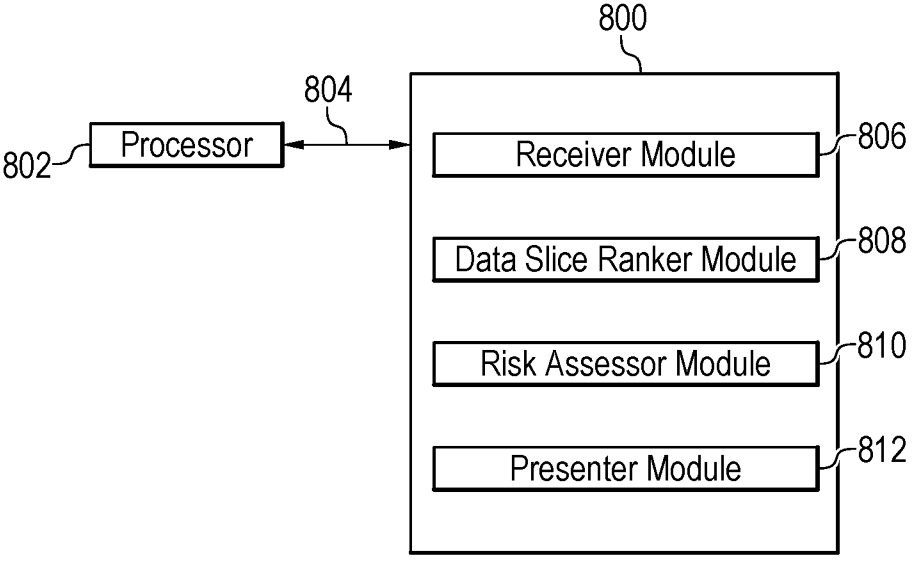
FIG. 8 is an example tangible, non-transitory computer-readable medium that can rank data slices and assess risk using data slices.

Referring now to FIG. 8, a block diagram is depicted of an example tangible, non-transitory computer-readable medium 800 that can rank data slices and assess risk using data slices. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 or 400 of FIGS. 3 and 4.

The various software components discussed herein may be stored on the tangible, non-transitory, computer-readable medium 800, as indicated in FIG. 8. For example, a receiver module 806 includes code to receive a test set, data slices of the test set, and a set of measures of interest. For example, the test set may include data points from the same feature space used to train a machine learning model. The receiver module 806 also includes code to receive a single quality measure. A data slice ranker module 808 includes code to grade, for a subset of each of the data slices, data points in each subset for each measure of interest based on uniqueness with respect to other data slices. The data slice ranker module 808 includes code to aggregate the grades of the data points in the subsets to generate a slice grade for each data slice. In some examples, the data slice ranker module 808 includes code to define a cooperative game for each of the measurers of interest for which the data slices are players and calculate the slice grades using a Shapley value. The data slice ranker module 808 includes code to rank the data slices based on slice grade. In some examples, the data slice ranker module 808 may include code to aggregate the generated slice grades to generate a single quality measure comprising a grade for the machine learning model trained on a training set. For example, the training set may include data points from the same feature space as the test set. A risk assessor module 810 includes code to compute a risk assessment score based on a test set, data slices, and the single quality measure. For example, the risk assessor module 810 may include code to receive a single quality measure, adjust the single quality measure grade of each of the data points based on an associated slice score, and compute the risk assessment score for the entire test set based on the adjusted single quality measure grades. A presenter module 812 may include code to present the ranked data slices along with a representative data point for each of the ranked data slices.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:

receive a test set and a measure of interest, wherein the test set comprises data points from a same feature space used to train a machine learning model, and wherein the measure of interest is selected from the group consisting of: an error concentration measure, an accuracy measure, a statistical significance measure, and a density measure;

generate data slices of the test set using an automated data slice finding technique;

generate slice grades for the data slices to represent a contribution of each data slice to the measure of interest with respect to other data slices of the test set, wherein the slice grades are generated by defining a cooperative game for the measure of interest, where the data slices are players and the slice grades are calculated using a Shapley value to identify a collection of the data slices associated with the measure of interest, where the Shapley value of each data slice is an independent sum of originalities of data points in the data slice associated with the measure of interest, where the originality of each data point associated with the measure of interest is inversely proportional to a number of data slices of the test set to which the data point belongs;

rank the data slices according to the slice grades representing the contribution of each data slice to the measure of interest with respect to other data slices of the test set;

based on the ranked data slices, identify a set of the data slices associated with a performance weakness of the machine learning model; and govern the machine learning model based on the set of the data slices identified as being associated with the performance weakness.

2. The system of claim 1, wherein the processor is configured to present the ranked data slices along with a representative data point for each of the ranked data slices, the representative data point including an explanation of a contribution of the representative data point with respect to the measure of interest.

3. The system of claim 1, wherein the processor is configured to present a predetermined number of top ranked data slices for the measure of interest.

4. The system of claim 1, wherein the processor is configured to aggregate the generated slice grades to generate a single quality measure comprising a grade for the machine learning model trained on a training set.

5. The system of claim 4, wherein the processor is configured to generate a risk assessment score based on the single quality measure.

6. A computer-implemented method, comprising:

receiving, via at least one processor, a test set and a set of measures of interest, wherein the test set comprises data points from a same feature space used to train a machine learning model, and wherein the set of measures of interest are selected from the group consisting of: an error concentration measure, an accuracy measure, a statistical significance measure, and a density measure;

generating, via the at least one processor, data slices of the test set using an automated data slice finding technique;

generating, via the at least one processor, slice grades for the data slices to represent a contribution of each data slice to each of the set of measures of interest with respect to other data slices of the test set, where the slice grades are generated by defining a cooperative game for each of the set of measures of interest, where the data slices are players and the slice grades are calculated using a Shapley value to identify error concentration and statistical significance of the data slices, where the Shapley value of each data slice is an independent sum of originalities of data points in the data slice, and where the originality of each misclassified data point is inversely proportional to a number of data slices to which the misclassified data point belongs;

ranking, via the at least one processor, the data slices according to the slice grades representing the contribution of each data slice to each of the set of measures of interest with respect to other data slices of the test set, the ranked data slices enabling identification of a set of the data slices associated with a performance weakness of the machine learning model; and governing the machine learning model based on the set of the data slices identified as being associated with the performance weakness.

7. The computer-implemented method of claim 6, further comprising aggregating the generated slice grades to generate a single quality measure comprising a grade for the machine learning model trained on a training set.

8. The computer-implemented method of claim 7, comprising computing, via the at least one processor, a risk assessment score based on the single quality measure.

9. The computer-implemented method of claim 6, further comprising presenting the ranked data slices along with a representative data point for each of the ranked data slices.

10. The computer-implemented method of claim 9, wherein the representative data point includes an explanation of a contribution of the representative data point with respect to the set of measures of interest.

11. A computer program product for ranking data slices, the computer program product comprising a computer-readable storage medium having program code embodied therewith, wherein the computer-readable storage medium is not a transitory signal per se, the program code executable by a processor to cause the processor to:

receive a test set and a set of measures of interest, wherein the test set comprises data points from a same feature space used to train a machine learning model, and wherein the set of measures of interest are selected from the group consisting of: an error concentration measure, an accuracy measure, a statistical significance measure, and a density measure;

generate data slices of the test set using an automated data slice finding technique;

generate slice grades for the data slices to represent a contribution of each data slice to each of the set of measures of interest with respect to other data slices of the test set, where the slice grades are generated by defining a cooperative game for each of the set of measures of interest, where the data slices are players and the slice grades are calculated using a Shapley value to identify error concentration and statistical significance of the data slices, where the Shapley value of each data slice is an independent sum of originalities of data points in the data slice, and where the originality of each misclassified data point is inversely proportional to a number of data slices to which the misclassified data point belongs;

rank the data slices according to the slice grades to represent a contribution of each data slice to each of the set of measures of interest with respect to other data slices of the test set, the ranked data slices enabling identification of a set of the data slices associated with a performance weakness of the machine learning model; and govern the machine learning model based on the set of the data slices identified as being associated with the performance weakness.

12. The computer program product of claim 11, further comprising program code executable by the processor to aggregate the generated slice grades to generate a single quality measure comprising a grade for the machine learning model trained on a training set.

13. The computer program product of claim 12, further comprising program code executable by the processor to compute a risk assessment score based on the single quality measure.

14. The computer program product of claim 11, further comprising program code executable by the processor to present the ranked data slices along with a representative data point for each of the ranked data slices.

15. The computer program product of claim 14, wherein the representative data point includes an explanation of a contribution of the representative data point with respect to the set of measures of interest.

* * * * *